J. H. THOMAS.
Seed Dropper.

No. 99,498.

Patented Feb. 1, 1870.

Witnesses:
Phil T. Dodge,
E. J. Sommer.

Inventor:
John Henry Thomas
By Dodge & Son
his Attys.

United States Patent Office.

JOHN HENRY THOMAS, OF SPRINGFIELD, OHIO.

Letters Patent No. 99,498, dated February 1, 1870.

IMPROVEMENT IN SEED-SOWER.

The Schedule referred to in these Letters Patent and making part of the same

I, JOHN HENRY THOMAS, of Springfield, Clark county, and State of Ohio, have invented certain Improvements in Grain-Drills, of which the following is a specification.

In the accompanying drawings—

Figure 1:
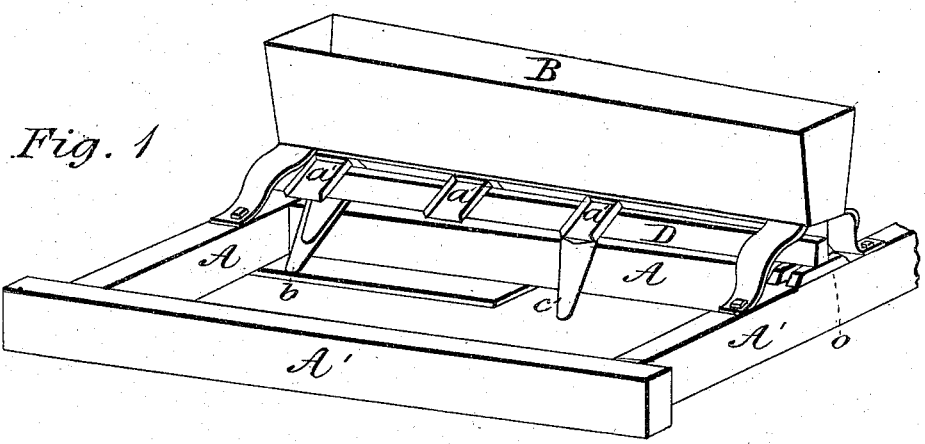

Figure 1 is a perspective view.

Figure 2:
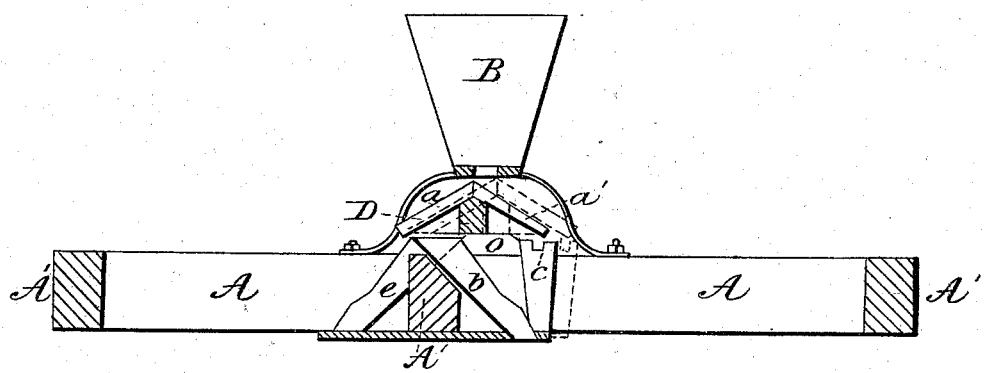

Figure 2, a longitudinal vertical section of the same.

My invention relates to that class of grain-drills which are so constructed as to sow the grain in drills, or broadcast, or both at once, as may be desired; and The invention consists in a novel construction and arrangement of spouts, that can be changed at will, to convey the grain from the hopper to the front or rear, as may be desired, as hereinafter explained.

I make the frame A and the hopper B in the usual manner, the latter being attached to the former, as represented in the drawings, or in any similar manner, so as to leave a space underneath, between it and the frame, to permit the interposition of the sliding spouts, as represented, the front end of the frame being indicated by A'.

Transversely of the frame A, and directly under the hopper B, I place a bar, D, which has secured to its upper side a series of double-inclined spouts, a a', as shown more clearly in fig. 2.

These spouts, as there shown, are arranged so that one part of them, a', inclines to the front, and the other part, a, to the rear.

These spouts, thus made in pairs, are attached permanently to the bar D, at such distances apart as to be directly under the discharge-holes in the hopper.

At each end the bar D is connected to a block, O, which has slots formed in each end, as represented in fig. 1, these blocks resting and sliding to and fro on the side bars of the frame A, and being guided and held in position by pins or bolts in the slots.

To the frame I attach a series of stationary spouts, e, inclining to the rear in such a position that when the bar D, with its spouts, is shoved forward, as shown in dotted lines in fig. 2, the grain from the hopper will fall into the spouts e, from whence it may be conveyed into the ordinary drill-tubes, or allowed to fall direct from the spout e to the ground, as preferred; or a series of spouts may be arranged to incline to the front, as represented by b of fig. 2, in which case the grain will be delivered at the front; or it may be delivered at the front by simply shoving the bar D back, and letting it fall from the spouts a' to the ground.

I also propose to use, in connection with the spouts a or a', tubes c, pivoted thereto, as represented in fig. 2.

When it is desired to construct the machine for sowing in drills and broadcast, both at once, the spouts b and e will be arranged in such positions that the grain for the drills will fall into the spouts e, while that to be sown broadcast, between and in front of the drills, will pass into the tubes b.

It will be seen, that by simply moving the bar D forward or back, the machine is at once converted from a broadcast-sower to a combined drill and broadcast-sower, or vice versa; or, by omitting the spouts b, it may, by thus moving the bar D, be at once changed from a drill to a broadcast-machine, or vice versa. Thus, by a very simple and cheap plan, I am enabled to produce a machine that can be used for all these various methods of sowing grain.

Having thus described my invention,

What I claim, is—

1. The sliding spouts a a', arranged under the hopper, in such a manner that they can be adjusted to deliver the grain at front or rear at will, substantially as described.

2. The combination of the sliding spouts a a' with the spouts b and e, arranged to operate as herein set forth.

3. The sliding spouts a a', with the spouts d pivoted thereto, substantially as described.

JOHN HENRY THOMAS.

Witnesses:
J. W. THOMAS,
A. W. BRETT.